United States Patent
Kakimoto et al.

(10) Patent No.: US 9,821,880 B2
(45) Date of Patent: Nov. 21, 2017

(54) BICYCLE RIM BRAKE

(71) Applicant: SHIMANO INC., Sakai (JP)

(72) Inventors: Tetsuya Kakimoto, Sakai (JP); Tatsuya Matsushita, Sakai (JP); Masahiro Nakakura, Sakai (JP); Shinya Hirotomi, Sakai (JP)

(73) Assignee: SHIMANO INC., Sakai (JP)

( * ) Notice: Subject to any disclaimer, the term of this patent is extended or adjusted under 35 U.S.C. 154(b) by 53 days.

(21) Appl. No.: 14/820,575

(22) Filed: Aug. 7, 2015

(65) Prior Publication Data

US 2017/0036732 A1    Feb. 9, 2017

(51) Int. Cl.
*B62L 1/16* (2006.01)
*B62L 1/00* (2006.01)

(52) U.S. Cl.
CPC ............ *B62L 1/16* (2013.01); *B62L 1/005* (2013.01)

(58) Field of Classification Search
CPC ...... B62L 1/16; B62L 1/12; B62L 1/14; B62L 1/06; B62L 1/02; B62L 3/02; B62L 3/026; B60T 1/06; B60T 11/046; F16D 65/0056
USPC .............................. 188/24.22, 24.21
See application file for complete search history.

(56) References Cited

U.S. PATENT DOCUMENTS

| | | | | |
|---|---|---|---|---|
| 5,328,001 A | * | 7/1994 | Yoshikawa | B62L 1/14 188/216 |
| 5,894,913 A | * | 4/1999 | Sugimoto | B62L 1/14 188/24.11 |
| 8,517,151 B2 | * | 8/2013 | Wehage | B62L 1/16 188/24.12 |
| 2009/0038894 A1 | * | 2/2009 | Liu | B62L 1/16 188/24.22 |
| 2012/0181120 A1 | * | 7/2012 | Jordan | B62L 1/12 188/24.21 |
| 2013/0020152 A1 | * | 1/2013 | Terada | B60T 1/06 188/24.22 |
| 2013/0025979 A1 | * | 1/2013 | Wehage | B62L 1/16 188/24.12 |
| 2013/0025980 A1 | | 1/2013 | Wehage | |

FOREIGN PATENT DOCUMENTS

| | | |
|---|---|---|
| DE | 1890527 U | 4/1964 |
| EP | 0872410 A2 | 10/1998 |
| EP | 2340987 | 7/2011 |
| EP | 2548793 | 1/2013 |

* cited by examiner

*Primary Examiner* — Xuan Lan Nguyen
(74) *Attorney, Agent, or Firm* — Mori & Ward, LLP (57) ABSTRACT

A bicycle rim brake comprises a first shaft, a second shaft, a first brake arm, a second brake arm, and a reinforcing member. The first shaft includes a first fixed end part fixedly provided with respect to a bicycle body. The second shaft includes a second fixed end part fixedly provided with respect to the bicycle body. The first brake arm is pivotally provided on the first shaft around a first pivot axis. The first brake arm has an opposite surface opposite to the first fixed end part. The second brake arm is pivotally provided on the second shaft around a second pivot axis. The reinforcing member couples the first shaft to the second shaft. The reinforcing member is provided such that the first brake arm is at least partially arranged farther from the first fixed end part than the reinforcing member.

30 Claims, 11 Drawing Sheets

BICYCLE RIM BRAKE

BACKGROUND OF THE INVENTION

Field of the Invention

The present invention relates to a bicycle rim brake.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle brake.

SUMMARY OF THE INVENTION

In accordance with a first aspect of the present invention, a bicycle rim brake comprises a first shaft, a second shaft, a first brake arm, a second brake arm, and a reinforcing member. The first shaft defines a first pivot axis. The first shaft includes a first fixed end part fixedly provided with respect to a bicycle body. The second shaft defines a second pivot axis. The second shaft includes a second fixed end part fixedly provided with respect to the bicycle body. The first brake arm is pivotally provided on the first shaft around the first pivot axis. The second brake arm is pivotally provided on the second shaft around the second pivot axis. The reinforcing member couples the first shaft to the second shaft. The reinforcing member is provided such that the first brake arm is at least partially arranged farther from the first fixed end part than the reinforcing member.

With the bicycle rim brake according to the first aspect, since the reinforcing member is configured to couple the first shaft and the second shaft, it is possible to improve the strength of the bicycle rim brake with a simple structure. Furthermore, the reinforcing member is provided such that the first brake arm is at least partially arranged farther from the first fixed end part than the reinforcing member. Thus, the reinforcing member can receive the force applied to the first shaft at a point farther from the first fixed end part of the first shaft. This can effectively improve the strength and appearance of the bicycle rim brake.

In accordance with a second aspect of the present invention, the bicycle rim brake according to the first aspect is configured so that the first brake arm includes a groove, and the reinforcing member includes a first coupling part arranged in the groove.

With the bicycle rim brake according to the second aspect, it is possible to easily arrange the first coupling part of the reinforcing member at a position farther from the first fixed end part.

In accordance with a third aspect of the present invention, the bicycle rim brake according to the first or second aspect is configured so that the reinforcing member is provided such that the second brake arm is at least partially arranged closer to the second fixed end part than the reinforcing member.

With the bicycle rim brake according to the third aspect, it is possible to make the bicycle rim brake compact while the bicycle rim brake includes the reinforcing member.

In accordance with a fourth aspect of the present invention, the bicycle rim brake according to the third aspect is configured so that the second shaft includes a second head part and a second supporting part. The second supporting part extends between the second fixed end part and the second head part so as to pivotally support the second brake arm. The reinforcing member includes a second coupling part arranged between the second brake arm and the second head part.

With the bicycle rim brake according to the fourth aspect, it is possible to couple the second coupling part of the reinforcing member to the second brake arm and the second head part of the second shaft. Accordingly, it is possible to effectively improve the strength of the bicycle rim brake.

In accordance with a fifth aspect of the present invention, the bicycle rim brake according to the fourth aspect is configured so that the second brake arm includes a recess. The second coupling part and the second head part are arranged in the recess.

With the bicycle rim brake according to the fifth aspect, it is possible to make the bicycle rim brake compact while the bicycle rim brake includes the reinforcing member.

In accordance with a sixth aspect of the present invention, the bicycle rim brake according to any one of the third to fifth aspects is configured so that the first brake arm and the second brake arm are configured such that a space is provided between the first brake arm and the second brake arm when viewed from a perpendicular direction perpendicular to at least one of the first pivot axis and the second pivot axis. The reinforcing member is at least partially arranged in the space.

With the bicycle rim brake according to the sixth aspect, it is possible to make the bicycle rim brake compact and to improve the appearance of the bicycle rim brake while the bicycle rim brake includes the reinforcing member.

In accordance with a seventh aspect of the present invention, the bicycle rim brake according to any one of the first to sixth aspects is configured so that the first brake arm includes an offset part arranged farther from the bicycle body than the second brake arm when viewed from a perpendicular direction perpendicular to at least one of the first pivot axis and the second pivot axis. The reinforcing member is arranged between the offset part of the first brake arm and the second brake arm.

With the bicycle rim brake according to the seventh aspect, it is possible to make the bicycle rim brake compact while the bicycle rim brake includes the reinforcing member.

In accordance with an eighth aspect of the present invention, the bicycle rim brake according to any one of the first to seventh aspects is configured so that the first pivot axis and the second pivot axis are substantially parallel to each other.

In accordance with a ninth aspect of the present invention, the bicycle rim brake according to any one of the first to eighth aspects further comprises a base member. The first shaft and the second shaft are provided on the base member.

With the bicycle rim brake according to the ninth aspect, it is possible to easily mount the bicycle rim brake to the bicycle body via the base member.

In accordance with a tenth aspect of the present invention, the bicycle rim brake according to the ninth aspect is configured so that the base member includes a mounting shaft, the mounting shaft being arranged apart from the first shaft and the second shaft.

In accordance with an eleventh aspect of the present invention, the bicycle rim brake according to the tenth aspect is configured so that the mounting shaft is arranged such that a first distance between the mounting shaft and the first shaft is substantially equal to a second distance between the mounting shaft and the second shaft when viewed from a parallel direction parallel to the mounting shaft.

In accordance with a twelfth aspect of the present invention, the bicycle rim brake according to the tenth or eleventh aspect is configured so that the first brake arm includes a first mounting part to mount a first friction member to the first brake arm. The second brake arm includes a second mounting part to mount a second friction member to the second brake arm. The mounting shaft is farther from the first mounting part than the first shaft. The mounting shaft is farther from the second mounting part than the second shaft.

In accordance with a thirteenth aspect of the present invention, the bicycle rim brake according to any one of the first to twelfth aspects is configured so that the reinforcing member includes a first coupling part, a second coupling part, and an intermediate part. The first coupling part includes a first opening. The second coupling part includes a second opening. The intermediate part is provided between the first coupling part and the second coupling part. The first shaft extends through the first opening. The second shaft extends through the second opening.

In accordance with a fourteenth aspect of the present invention, the bicycle rim brake according to the thirteenth aspect is configured so that the second coupling part is offset from a first plane on which the first coupling part is arranged.

With the bicycle rim brake according to the fourteenth aspect, it is possible to arrange the reinforcing member along the shapes of the first brake arm and the second brake arm.

In accordance with a fifteenth aspect of the present invention, the bicycle rim brake according to the fourteenth aspect is configured so that the intermediate part is arranged on the first plane.

In accordance with a sixteenth aspect of the present invention, the bicycle rim brake according to any one of the first to fifteenth aspects is configured so that the first brake arm includes a wire attachment part to attach an inner wire of a control cable to the first brake arm. The second brake arm includes an outer-casing attachment part to attach an outer casing of the control cable to the second brake arm.

In accordance with a seventeenth aspect of the present invention, a bicycle rim brake comprises a base member, a first shaft, a second shaft, a first brake arm, a second brake arm, and a reinforcing member. The base member includes a mounting shaft. The first shaft is provided on the base member apart from the mounting shaft. The second shaft is provided on the base member apart from the mounting shaft and the first shaft. The first brake arm is configured to be pivotally provided on the first shaft. The first brake arm includes a first contact part. The second brake arm is configured to be pivotally provided on the second shaft. The second brake arm includes a second contact part being in contact with the first contact part. The reinforcing member couples the first pivot shaft to the second pivot shaft.

With the bicycle rim brake according to the seventeenth aspect, since the reinforcing member is configured to couple the first shaft and the second shaft, it is possible to improve the strength of the bicycle rim brake with a simple structure. Furthermore, since the second contact part of the second brake arm is configured to be in contact with the first contact part of the first brake arm, it is possible to move the first brake arm and the second brake arm in conjunction with each other. This can simplify the structure of the bicycle rim brake.

In accordance with an eighteenth aspect of the present invention, the bicycle rim brake according to the seventeenth aspect is configured so that the first shaft includes a first fixed end part fixed to the base member. The first brake arm has an opposite surface opposite to the first fixed end part. The reinforcing member is at least partially arranged between the first fixed end part of the first shaft and the opposite surface of the first brake arm.

In accordance with a nineteenth aspect of the present invention, the bicycle rim brake according to the seventeenth aspect is configured so that the first shaft includes a first fixed end part fixed to the base member. The reinforcing member is provided such that the first brake arm is at least partially arranged farther from the first fixed end part than the reinforcing member.

In accordance with a twentieth aspect of the present invention, a bicycle rim brake comprises a first shaft, a second shaft, a first brake arm, a second brake arm, and a reinforcing member. The first shaft defines a first pivot axis. The first shaft includes a first fixed end part fixedly provided with respect to a bicycle body. The second shaft defines a second pivot axis. The second shaft includes a second fixed end part fixedly provided with respect to the bicycle body. The first brake arm is pivotally provided on the first shaft around the first pivot axis. The first brake arm has an opposite surface opposite to the first fixed end part. The second brake arm is pivotally provided on the second shaft around the second pivot axis. The reinforcing member couples the first shaft to the second shaft. The reinforcing member is at least partially arranged between the first fixed end part of the first shaft and the opposite surface of the first brake arm.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

First Embodiment

Figure 1:
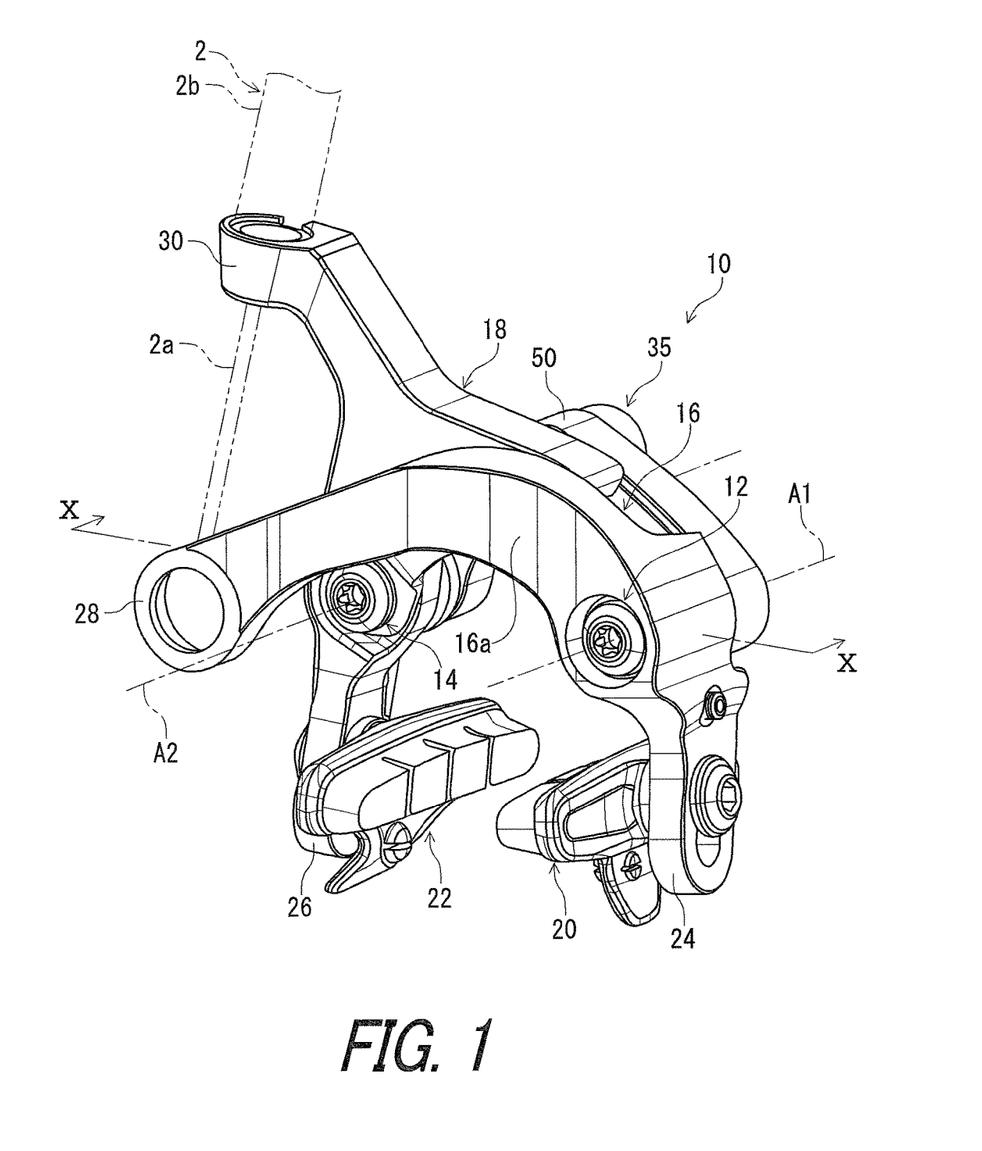
FIG. 1 is a front perspective view of a bicycle rim brake in accordance with a first embodiment.
Figure 2:
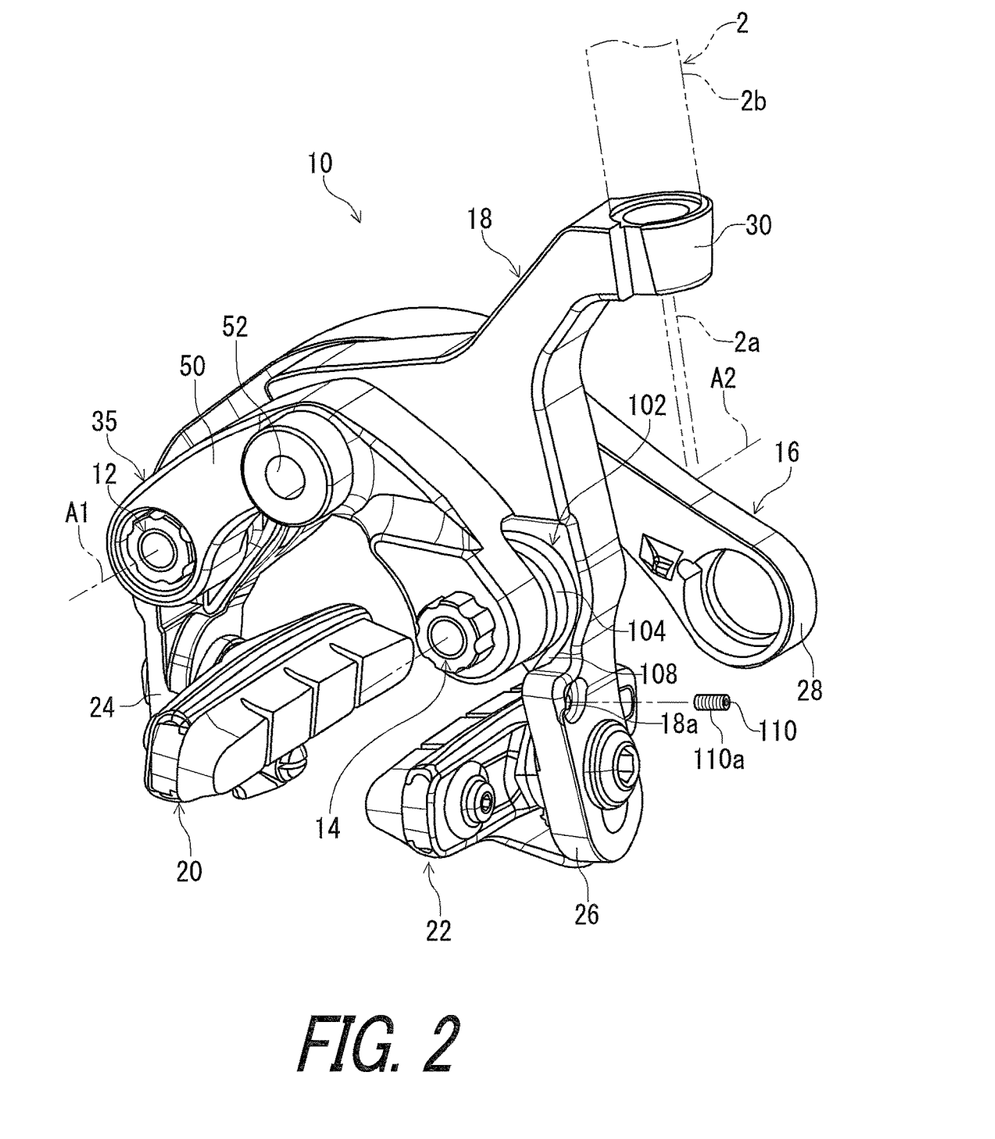
FIG. 2 is a rear perspective view of the bicycle rim brake illustrated in FIG. 1.
Figure 3:
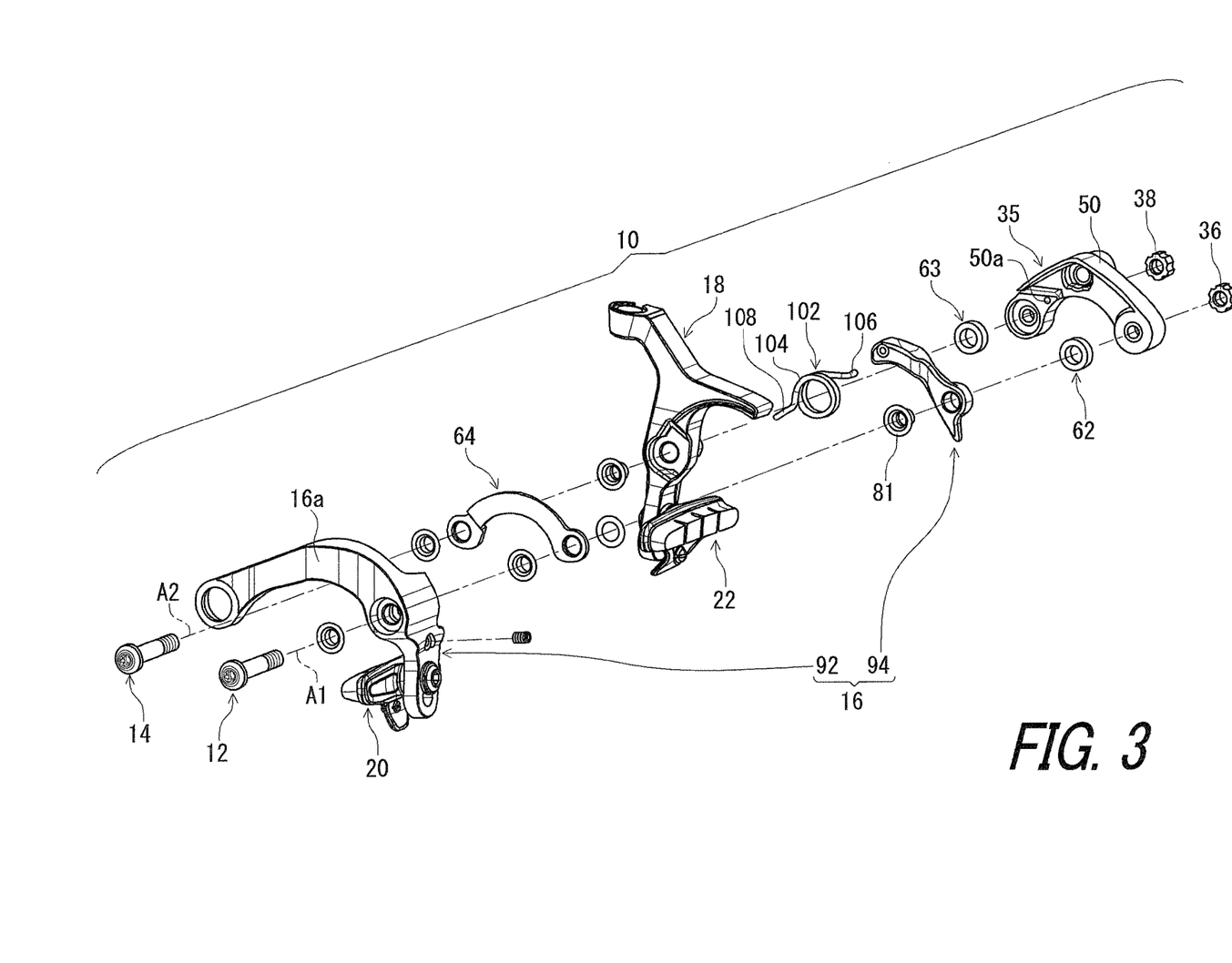
FIG. 3 is an exploded perspective view of the bicycle rim brake illustrated in FIG. 1.

Referring initially to FIGS. 1 to 3, a bicycle rim brake 10 in accordance with a first embodiment comprises a first shaft 12, a second shaft 14, a first brake arm 16, and a second brake arm 18. The first shaft 12 defines a first pivot axis A1. The second shaft 14 defines a second pivot axis A2. The first brake arm 16 is pivotally provided on the first shaft 12 around the first pivot axis A1. The second brake arm 18 is pivotally provided on the second shaft 14 around the second pivot axis A2. In this embodiment, the first pivot axis A1 and the second pivot axis A2 are substantially parallel to each other. Specifically, the first pivot axis A1 and the second pivot axis A2 are parallel to each other. However, the first pivot axis A1 and the second pivot axis A2 can be non-parallel to each other.

The bicycle rim brake 10 comprises a first friction member 20 and a second friction member 22. The first brake arm 16 includes a first mounting part 24 to mount the first friction member 20 to the first brake arm 16. The second brake arm 18 includes a second mounting part 26 to mount the second friction member 22 to the second brake arm 18. The first mounting part 24 is arranged apart from the first shaft 12. The second mounting part 26 is arranged apart from the second shaft 14.

The first brake arm 16 includes a wire attachment part 28 to attach an inner wire 2a of a control cable 2 to the first brake arm 16. The second brake arm 18 includes an outer-casing attachment part 30 to attach an outer casing 2b of the control cable 2 to the second brake arm 18. Examples of the control cable 2 include a Bowden cable. A wire attachment structure (not shown) is provided on the wire attachment part 28. The wire attachment structure includes a nut pivotally mounted on the wire attachment part 28, and a bolt screwed into the nut. Such a wire attachment is well known in the bicycle field, and its detailed explanation is omitted for the sake of brevity.

Figure 4:
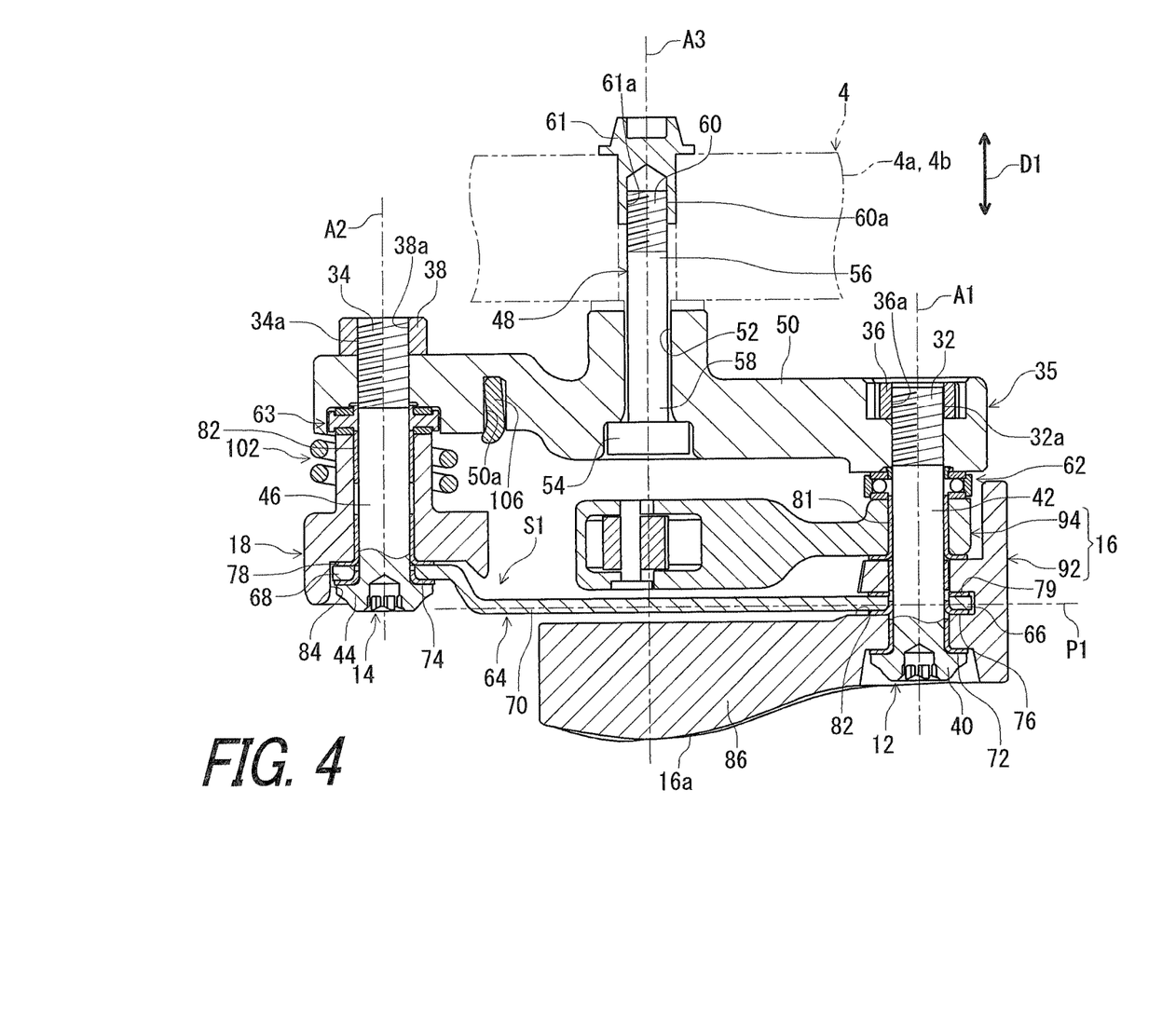
FIG. 4 is a cross-sectional view of the bicycle rim brake taken along line IV-IV of FIG. 5.

As seen in FIG. 4, the first shaft 12 includes a first fixed end part 32 fixedly provided with respect to a bicycle body 4. The second shaft 14 includes a second fixed end part 34 fixedly provided with respect to the bicycle body 4. In this embodiment, the bicycle rim brake 10 further comprises a base member 35 configured to be mounted on the bicycle body 4. The first shaft 12 and the second shaft 14 are provided on the base member 35.

The first fixed end part 32 of first shaft 12 and the second fixed end part 34 of the second shaft 14 are attached or fixed to the base member 35. Specifically, the bicycle rim brake 10 includes a first nut 36 and a second nut 38. The first nut 36 includes a first threaded hole 36a. The second nut 38 includes a second threaded hole 38a. The first fixed end part 32 includes external threads 32a engaged with the first threaded hole 36a of the first nut 36. The second fixed end part 34 includes external threads 34a engaged with the second threaded hole 38a of the second nut 38.

The first shaft 12 includes a first head part 40 and a first supporting part 42. The first supporting part 42 extends between the first fixed end part 32 and the first head part 40 so as to pivotally support the first brake arm 16. The first brake arm 16 is pivotally coupled to the base member 35 via the first shaft 12 and the first nut 36. The first brake arm 16 has an opposite surface 16a opposite to the first fixed end part. The second shaft 14 includes a second head part 44 and a second supporting part 46. The second supporting part 46 extends between the second fixed end part 34 and the second head part 44 so as to pivotally support the second brake arm 18. The second brake arm 18 is pivotally coupled to the base member 35 via the second shaft 14 and the second nut 38.

In this embodiment, the bicycle body 4 includes a bicycle frame 4a and a front fork 4b rotatably attached to the bicycle frame 4a. The base member 35 is configured to be mounted on one of the bicycle frame 4a and the front fork 4b. In the illustrated embodiment, the first fixed end part 32 and the second fixed end part 34 are fixed with respect to the bicycle body 4 via the base member 35. However, the base member 35 can be omitted from the bicycle rim brake 10. In such an embodiment, the first fixed end part 32 and the second fixed end part 34 are directly fixed with respect to the bicycle body 4.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle rim brake 10, should be interpreted relative to the bicycle equipped with the bicycle rim brake 10 as used in an upright riding position on a horizontal surface.

As seen in FIG. 4, the base member 35 includes a mounting shaft 48 configured to be inserted into the bicycle body 4. In this embodiment, the mounting shaft 48 has a center axis A3. The base member 35 includes a base body 50. The base body 50 is mounted to the bicycle body 4 via the mounting shaft 48 in a mounting state where the bicycle rim brake 10 is mounted on the bicycle body 4.

Specifically, the base body 50 includes a mounting through-hole 52. The mounting shaft 48 includes a mounting head part 54 and a mounting shaft body 56. The mounting shaft body 56 includes a first shaft end 58 and a second shaft end 60 opposite to the first shaft end 58. The mounting head part 54 is provided at the first shaft end 58. The base body 50 and the mounting head part 54 are configured to mate with each other such that a relative rotational movement between the base body 50 and the mounting head part 54 is prevented. The second shaft end 60 includes external threads 60a. The base member 35 includes a securing member 61 including a threaded hole 61a. The external threads 60a of the mounting shaft 48 is configured to be engaged with the threaded hole 61a of the securing member 61. The base body 50 is coupled to the bicycle body 4 via the mounting shaft 48 and the securing member 61 by tightening the securing member 61.

The bicycle rim brake 10 includes a first bearing unit 62 and a second bearing unit 63. The first bearing unit 62 is provided between the first brake arm 16 and the base member 35 to pivotally support the first brake arm 16 relative to the first shaft 12 and the base member 35. The second bearing unit 63 is provided between the second brake arm 18 and the base member 35 to pivotally support the second brake arm 18 relative to the second shaft 14 and the base member 35.

Figure 5:
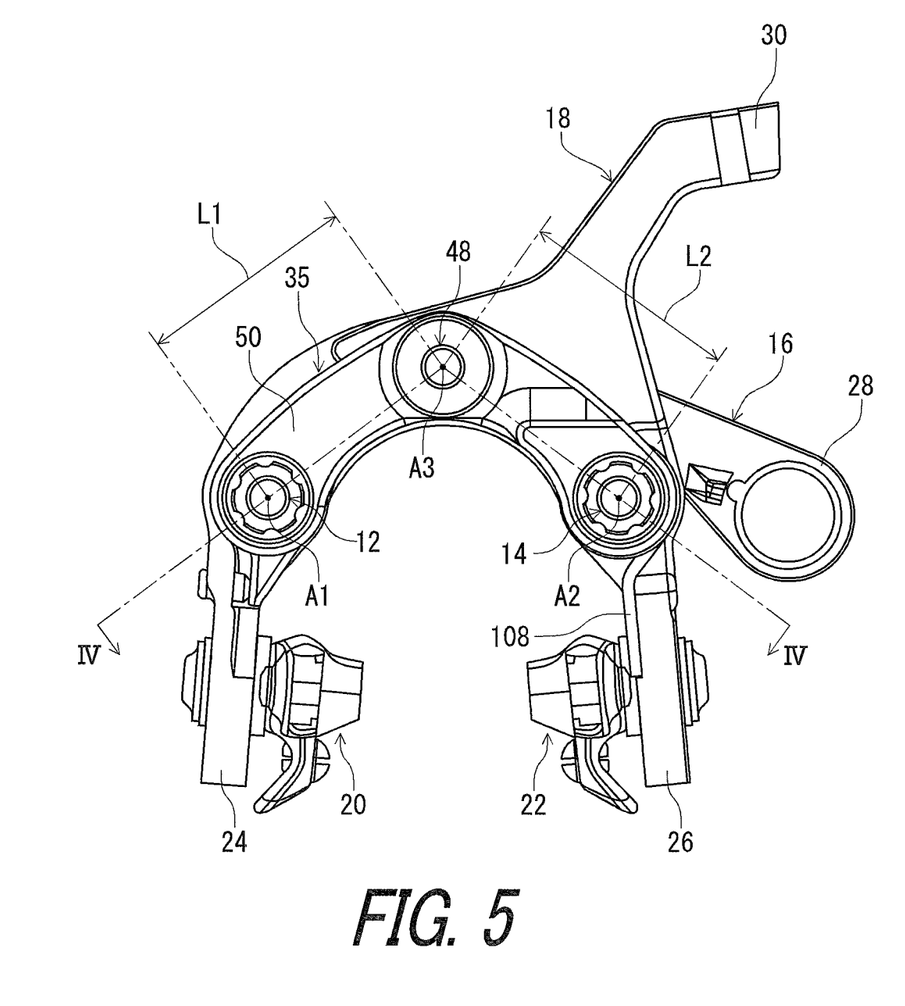
FIG. 5 is a rear view of the bicycle rim brake illustrated in FIG. 1.

As seen in FIG. 5, the first shaft 12 is arranged apart from the mounting shaft 48. The second shaft 14 is arranged apart from the mounting shaft 48 and the first shaft 12. The mounting shaft 48 is arranged apart from the first shaft 12 and the second shaft 14. The mounting shaft 48 is farther from the first mounting part 24 than the first shaft 12. The mounting shaft 48 is farther from the second mounting part 26 than the second shaft 14. The mounting shaft 48 is arranged such that a first distance L1 between the mounting shaft 48 and the first shaft 12 is substantially equal to a second distance L2 between the mounting shaft 48 and the second shaft 14 when viewed from a parallel direction D1 (FIG. 4) parallel to the mounting shaft 48. In this embodiment, the first distance L1 is equal to the second distance L2. However, the first distance L1 can be different from the second distance L2. In this embodiment, as seen in FIG. 4, the parallel direction D1 is parallel to the center axis A3 of the mounting shaft 48. The parallel direction D1 is parallel to the first pivot axis A1 and the second pivot axis A2.

Figure 6:
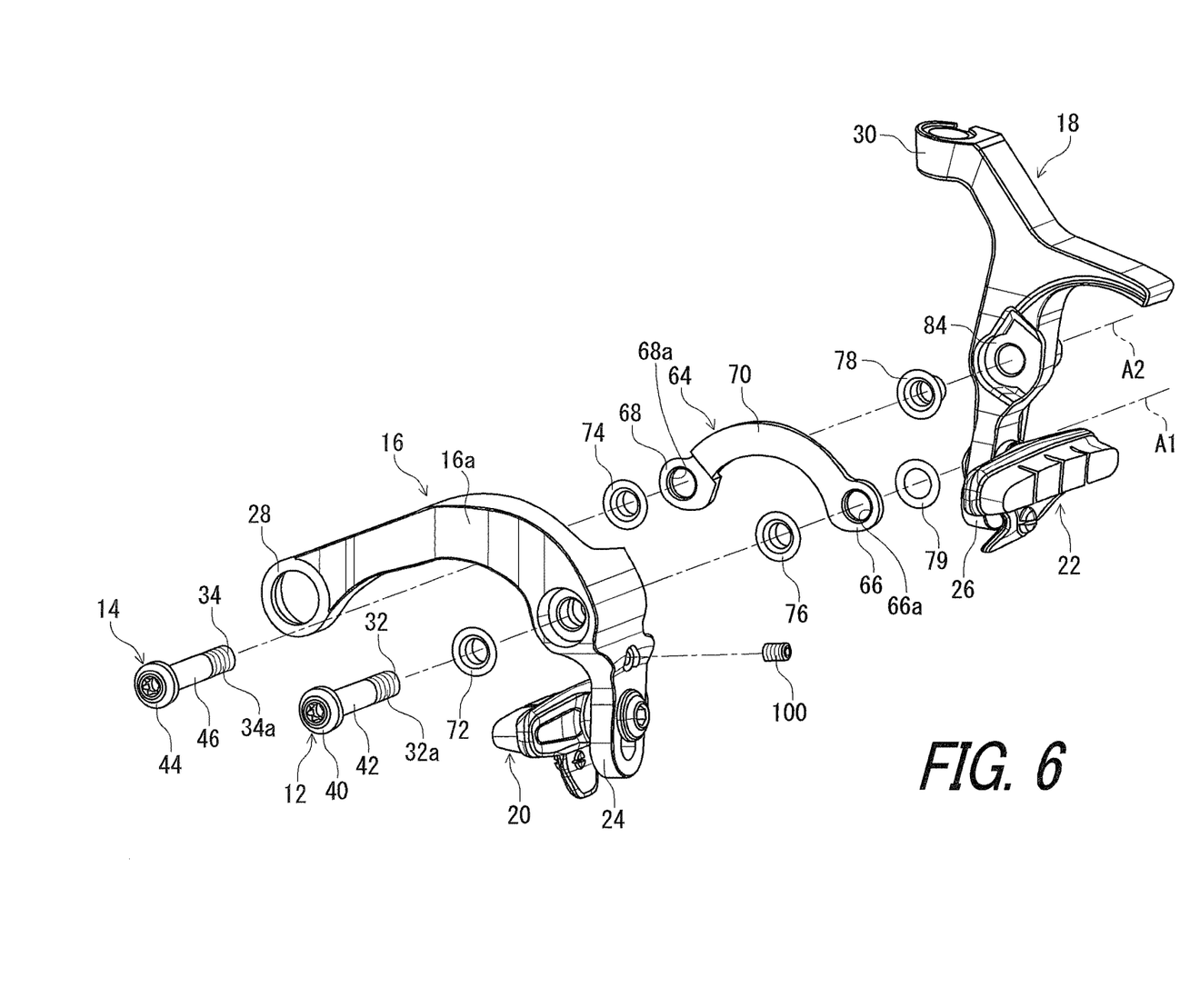
FIG. 6 is a partial exploded perspective view of the bicycle rim brake illustrated in FIG. 1.

As seen in FIG. 6, the bicycle rim brake 10 comprises a reinforcing member 64 coupling the first shaft 12 to the second shaft 14. As seen in FIG. 4, the reinforcing member 64 is provided such that the first brake arm 16 is at least partially arranged farther from the first fixed end part 32 than the reinforcing member 64. The reinforcing member 64 is at least partially arranged between the first fixed end part 32 of the first shaft 12 and the opposite surface 16a of the first brake arm 16. The reinforcing member 64 is provided such that the second brake arm 18 is at least partially arranged closer to the second fixed end part 34 than the reinforcing member 64. In other words, the second brake arm 18 is at least partially arranged between the reinforcing member 64 and the second fixed end part 34 of the second shaft 14.

In this embodiment, the reinforcing member 64 is provided such that the first brake arm 16 is partially arranged farther from the first fixed end part 32 than the reinforcing member 64. The reinforcing member 64 is provided such that the second brake arm 18 is arranged partially closer to the second fixed end part 34 than the reinforcing member 64. However, the reinforcing member 64 can be provided such that the first brake arm 16 is entirely arranged farther from the first fixed end part 32 than the reinforcing member 64. The reinforcing member 64 can be provided such that the second brake arm 18 is arranged entirely closer to the second fixed end part 34 than the reinforcing member 64.

As seen in FIG. 6, the reinforcing member 64 includes a first coupling part 66, a second coupling part 68, and an intermediate part 70. The first coupling part 66 includes a first opening 66a. The second coupling part 68 includes a second opening 68a. The intermediate part 70 is provided between the first coupling part 66 and the second coupling part 68. The first shaft 12 extends through the first opening 66a. The second shaft 14 extends through the second opening 68a.

Figure 7:
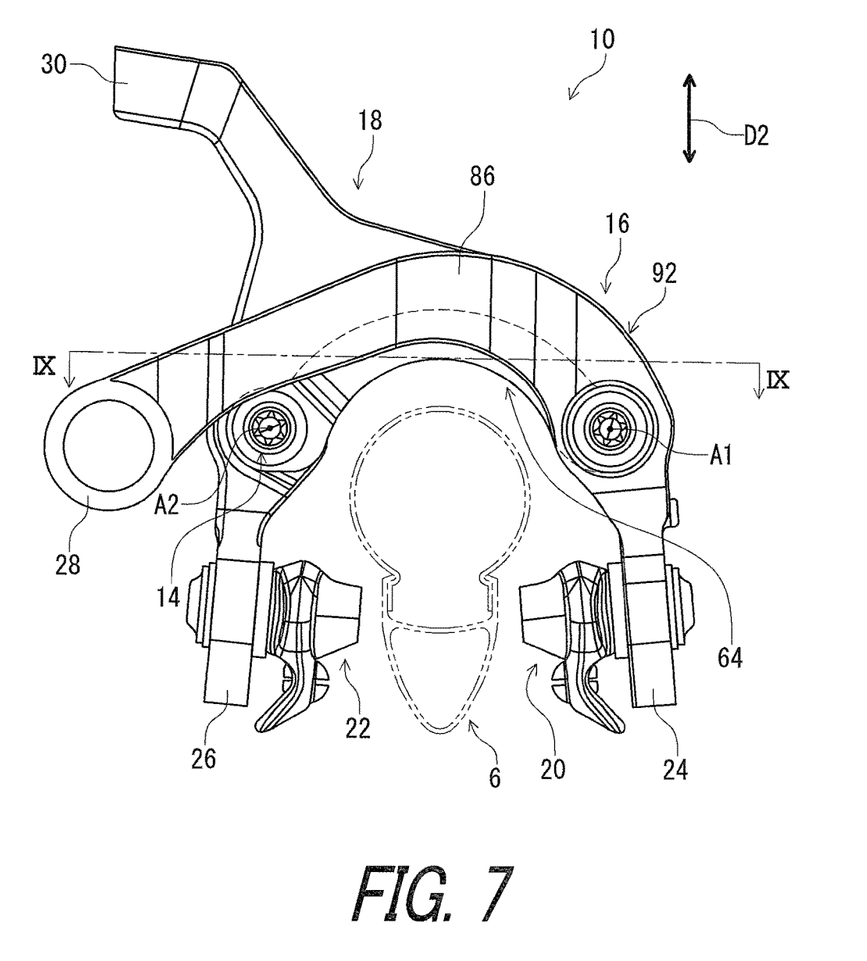
FIG. 7 is a front view of the bicycle rim brake illustrated in FIG. 1.

In this embodiment, as seen in FIG. 7, the intermediate part 70 has a curved shape to avoid interference between the reinforcing member 64 and a bicycle wheel 6. However, the shape of the reinforcing member 64 is not limited to this embodiment. The first brake arm 16 and the second brake attn 18 at least partially overlap with the reinforcing member 64 when viewed from the parallel direction D1 in a non-operated state of the bicycle rim brake 10. Further, the base member 35 at least partially overlaps with the reinforcing member 64 when viewed from the parallel direction D1.

As seen in FIGS. 4 and 6, the bicycle rim brake 10 includes a first bush 72, a second bush 74, a third bush 76, a fourth bush 78, and a washer 79. The first bush 72 is provided between the first shaft 12 and the first brake arm 16. The second bush 74 is provided between the second shaft 14 and the second coupling part 68 of the reinforcing member 64. The third bush 76 is provided between the first brake arm 16 and the first coupling part 66 of the reinforcing member 64. The reinforcing member 64 is provided between the second brake arm 18 and the second coupling part 68 of the reinforcing member 64. The washer 79 is provided between the first brake arm 16 and the first coupling part 66 of the reinforcing member 64. As seen in FIG. 4, the bicycle rim brake 10 includes a fifth bush 80 and a sixth bush 81. The fifth bush 80 is provided between the first shaft 12 and the first brake arm 16. The sixth busy 81 is provided between the second shaft 14 and the second brake arm 18.

Figure 8:
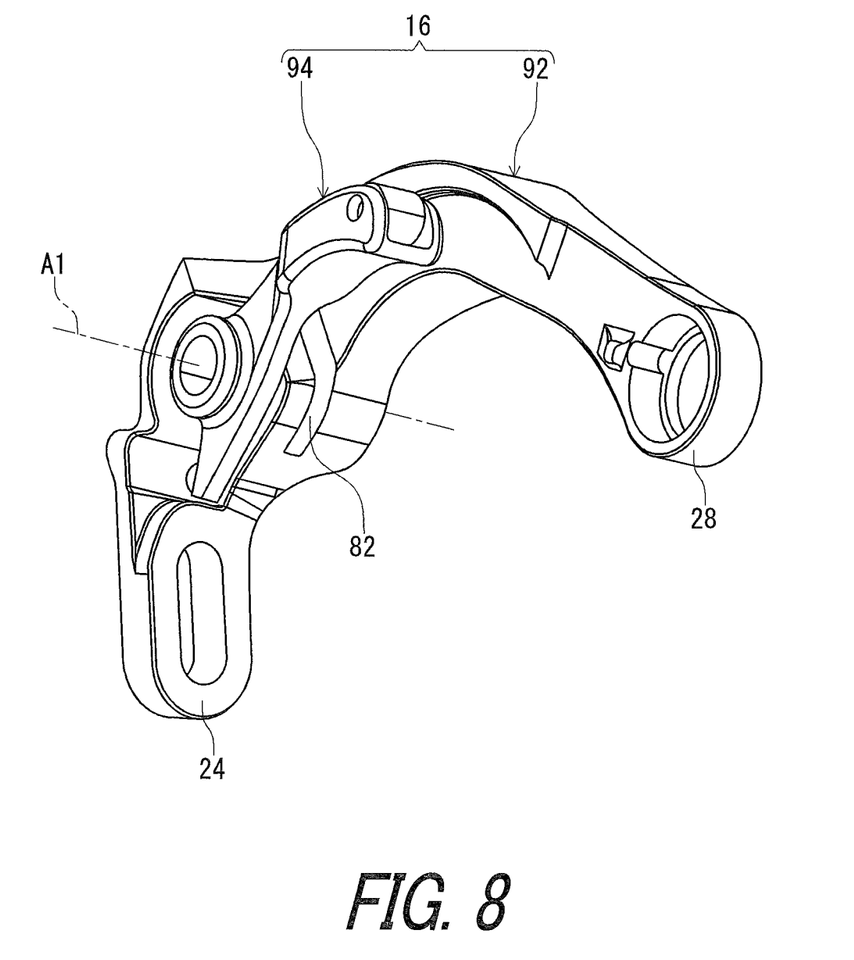
FIG. 8 is a perspective view of a first brake arm of the bicycle rim brake illustrated in FIG. 1.

As seen in FIGS. 4 and 8, the first brake arm 16 includes a groove 82. As seen in FIG. 4, the first coupling part 66 is arranged in the groove 82. In this embodiment, the first coupling part 66 and the washer 79 are provided in the groove 82. The second coupling part 68 is arranged between the second brake arm 18 and the second head part 44. As seen in FIGS. 4 and 6, the second brake arm 18 includes a recess 84. The second coupling part 68 and the second head part 44 are arranged in the recess 84.

Figure 9:
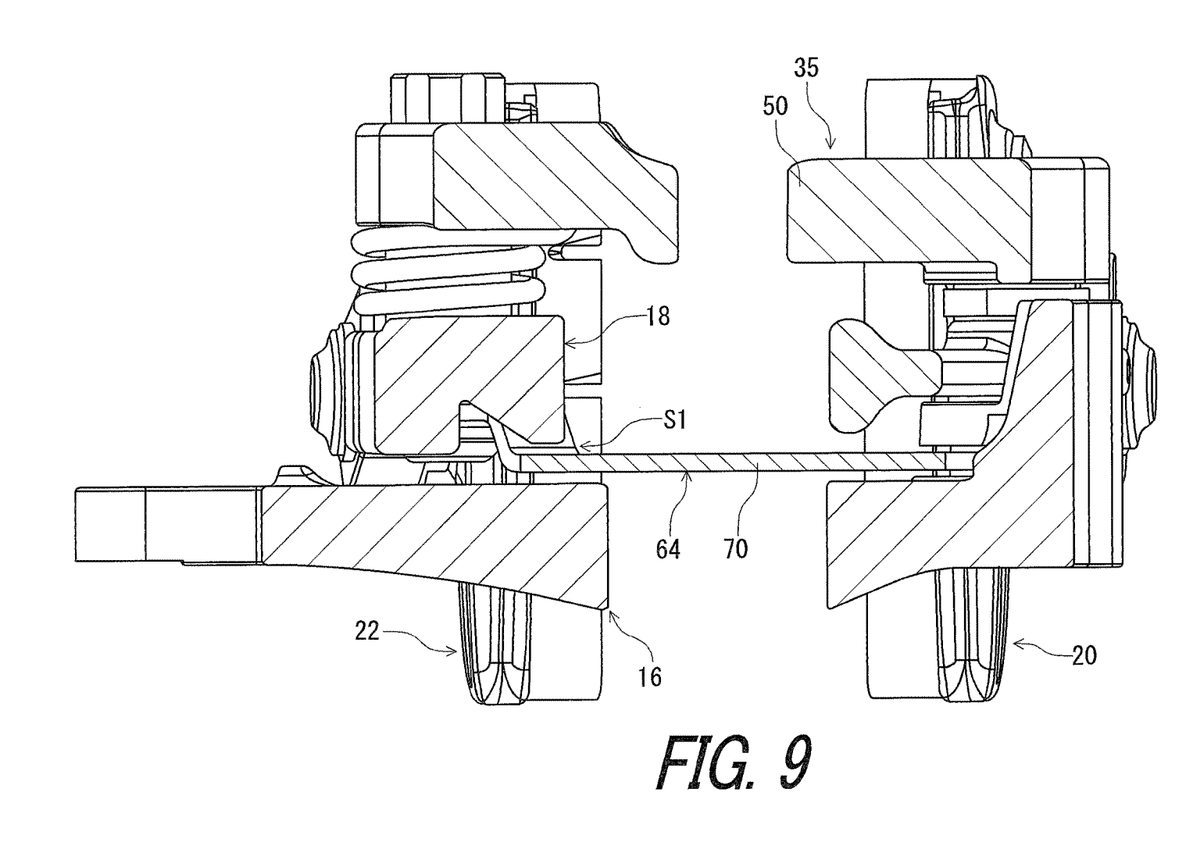
FIG. 9 is a cross-sectional view of the bicycle rim brake taken along line IX-IX of FIG. 7.

As seen in FIG. 9, the first brake arm 16 and the second brake arm 18 are configured such that a space S1 is provided between the first brake arm 16 and the second brake arm 18 when viewed from a perpendicular direction (e.g., a direction D2 in FIG. 7) perpendicular to at least one of the first pivot axis A1 and the second pivot axis A2. The reinforcing member 64 is at least partially arranged in the space S1. In this embodiment, the reinforcing member 64 is partially arranged in the space S1. However, the reinforcing member 64 can be entirely arranged in the space S1.

As seen in FIG. 4, the first brake min 16 includes an offset part 86 arranged farther from the bicycle body 4 than the second brake arm 18 when viewed from the perpendicular direction D2. The opposite surface is provided on the offset part 86 as an outermost surface with respect to the first fixed end part 32 in the parallel direction D1. The reinforcing member 64 is arranged between the offset part 86 of the first brake arm 16 and the second brake arm 18. The second coupling part 68 is offset from a first plane P1 on which the first coupling part 66 is arranged. The intermediate part 70 is arranged on the first plane P1. In this embodiment, the first plane P1 is defined at an axial center position of the first coupling part 66 and is perpendicular to the first pivot axis A1.

Figure 10:
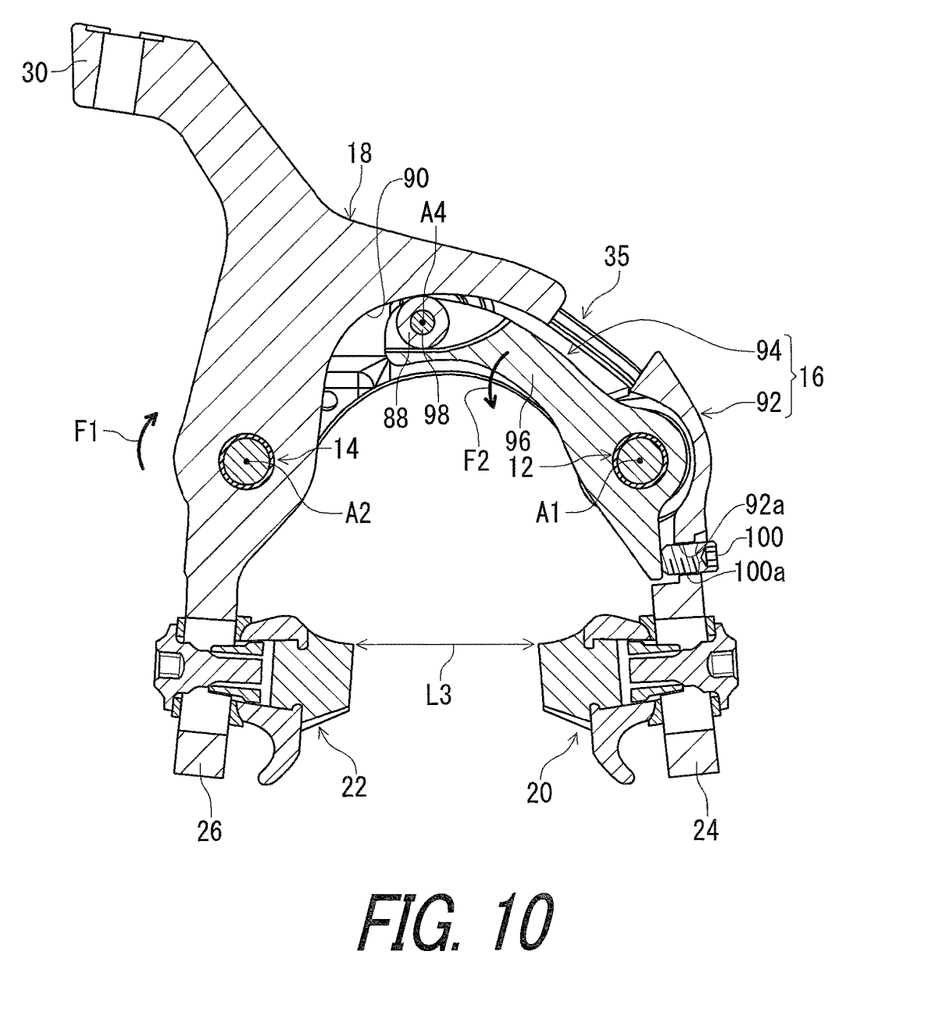
FIG. 10 is a cross-sectional view of the bicycle rim brake taken along line X-X of FIG. 1.

As seen in FIG. 10, the first brake arm 16 includes a first contact part 88. The second brake arm 18 includes a second contact part 90 being in contact with the first contact part 88. As seen in FIG. 8, the first brake arm 16 includes an arm body 92 and an intermediate member 94. The arm body 92 includes the first mounting part 24, the wire attachment part 28, and the groove 82. The intermediate member 94 is a separate member from the arm body 92.

As seen in FIG. 4, the intermediate member 94 is pivotally mounted on the first shaft 12 about the first pivot axis A1. The intermediate member 94 is closer to the first fixed end part 32 of the first shaft 12 than the arm body 92.

As seen in FIG. 10, the intermediate member 94 includes the first contact part 88, an intermediate body 96, and a pin 98. The first contact part 88 is rotatably attached to the intermediate body 96 about a rotational axis A4 via the pin 98. Namely, the first contact part 88 is provided as a roller. The second contact part 90 is provided as a cam surface. The first brake arm 16 includes an adjusting member 100. The arm body 92 includes an adjusting threaded hole 92a. The adjusting member 100 has external threads 100a engaged with the adjusting threaded hole 92a. The adjusting member 100 is contactable with the intermediate member 94. Rotation of the adjusting member 100 changes a position of the intermediate member 94 relative to the arm body 92 about the first pivot axis A1. This changes a relative position between the first brake arm 16 and the second brake arm 18 in a state where the first contact part 88 is in contact with the second contact part 90, changing a distance L3 defined between the first friction member 20 and the second friction member 22.

As seen in FIGS. 2 to 4, the bicycle rim brake 10 includes a biasing member 102 configured to bias the second brake arm 18 relative to the base member 35. As seen in FIG. 4, the biasing member 102 is mounted on the second shaft 14. As seen in FIG. 3, the biasing member 102 includes a coiled body 104, a first end 106, and a second end 108. The coiled body 104 is configured to generate a biasing force F1 (FIG. 10). The first end 106 extends from the coiled body 104. The second end 108 extends from the coiled body 104.

As seen in FIGS. 3 and 4, the first end 106 is engaged with the base body 50 of the base member 35. In more detail, the first end 106 is inserted to a first attachment hole 50a or the base body 50. As seen in FIG. 2, the second end 108 is engaged with the second brake arm 18 to transmit the biasing force F1 (FIG. 10) to the second brake arm 18. The second end 108 is arranged at an arrangement recess (not shown) of the second brake arm 18. The arrangement recess faces the second friction member 22. A tension adjusting member is provided on at least one of the second brake arm 18 and the base member 35. In this embodiment, a tension adjusting member 110 is provided on the second brake arm 18 to change a position of the second end 108. The second brake arm 18 has an adjusting threaded hole 18a being communicated with the arrangement recess. The tension adjusting member 110 has external threads 110a engaged with the adjusting threaded hole 18a. The tension adjusting member 110 is contactable with the second end 108. Rotation of the adjusting member 110 changes a position of the second end 108 relative to the second brake arm 18. The biasing force F1 (FIG. 10) is changed in accordance the position of the second end 108. As seen in FIG. 10, the biasing force F1 is transmitted via the second contact part 90 and the first contact part 88 in order, and the biasing force F1 is applied to the first brake arm 16 as a biasing force F2. In addition to or instead of the tension adjusting member 110, a tension adjusting member can be provided on the base member 35 with a same manner as the tension adjusting member 110 and the adjusting threaded hole 18a.

The bicycle rim brake 10 includes the following features.

(1) Since the reinforcing member 64 is configured to couple the first shaft 12 and the second shaft 14, it is possible to improve the strength of the bicycle rim brake 10 with a simple structure. Furthermore, the reinforcing member 64 is provided such that the first brake arm 16 is at least partially arranged farther from the first fixed end part 32 than the reinforcing member 64. Thus, the reinforcing member 64 can receive the force applied to the first shaft 12 at a point farther from the first fixed end part 32 of the first shaft 12. This can effectively improve the strength and appearance of the bicycle rim brake 10.

(2) The first coupling part 66 is configured to be arranged in the groove 82. Accordingly, it is possible to easily arrange the first coupling part 66 of the reinforcing member 64 at a position farther from the first fixed end part 32.

(3) The reinforcing member 64 is provided such that the second brake arm 18 is at least partially arranged closer to the second fixed end part 34 than the reinforcing member 64. Accordingly, it is possible to make the bicycle rim brake 10 compact and to improve the appearance of the bicycle rim brake 10 while the bicycle rim brake 10 includes the reinforcing member 64.

(4) The second coupling part 68 is configured to be arranged between the second brake arm 18 and the second head part 44. Accordingly, it is possible to couple the second coupling part 68 of the reinforcing member 64 to the second brake arm 18 and the second head part 44 of the second shaft 14. Accordingly, it is possible to effectively improve the strength of the bicycle rim brake 10.

(5) The second coupling part 68 and the second head part 44 are arranged in the recess 84 of the second brake arm 18. Accordingly, it is possible to make the bicycle rim brake 10 compact while the bicycle rim brake 10 includes the reinforcing member 64.

(6) The first brake arm 16 and the second brake arm 18 are configured such that the space S1 is provided between the first brake arm 16 and the second brake arm 18 when viewed from the perpendicular direction D2. The reinforcing member 64 is at least partially arranged in the space. Accordingly, it is possible to make the bicycle rim brake 10 compact while the bicycle rim brake 10 includes the reinforcing member 64.

(7) The reinforcing member 64 is arranged between the offset part 86 of the first brake arm 16 and the second brake arm 18. Accordingly, it is possible to make the bicycle rim brake 10 compact while the bicycle rim brake 10 includes the reinforcing member 64.

(8) The first shaft 12 and the second shaft 14 are provided on the base member 35. Accordingly, it is possible to easily mount the bicycle rim brake 10 to the bicycle body 4 via the base member 35.

(9) The second coupling part 68 is offset from the first plane P1 on which the first coupling part 66 is arranged. Accordingly, it is possible to arrange the reinforcing member 64 along the shapes of the first brake arm 16 and the second brake arm 18.

(10) Since the reinforcing member 64 is configured to couple the first shaft 12 and the second shaft 14, it is possible to improve the strength of the bicycle rim brake 10 with a simple structure. Furthermore, since the second contact part 90 of the second brake arm 18 is configured to be in contact with the first contact part 88 of the first brake arm 16, it is possible to move the first brake arm 16 and the second brake arm 18 in conjunction with each other. This can simplify the structure of the bicycle rim brake 10.

Second Embodiment

A bicycle rim brake 210 in accordance with a second embodiment will be described below referring to FIG. 11. The bicycle rim brake 210 has the same configuration as the bicycle rim brake 10 except for the reinforcing member 64 and its arrangement. Thus, elements having substantially the same function as those in the first embodiment will be numbered the same here, and will not be described and/or illustrated again in detail here for the sake of brevity.

Figure 11:
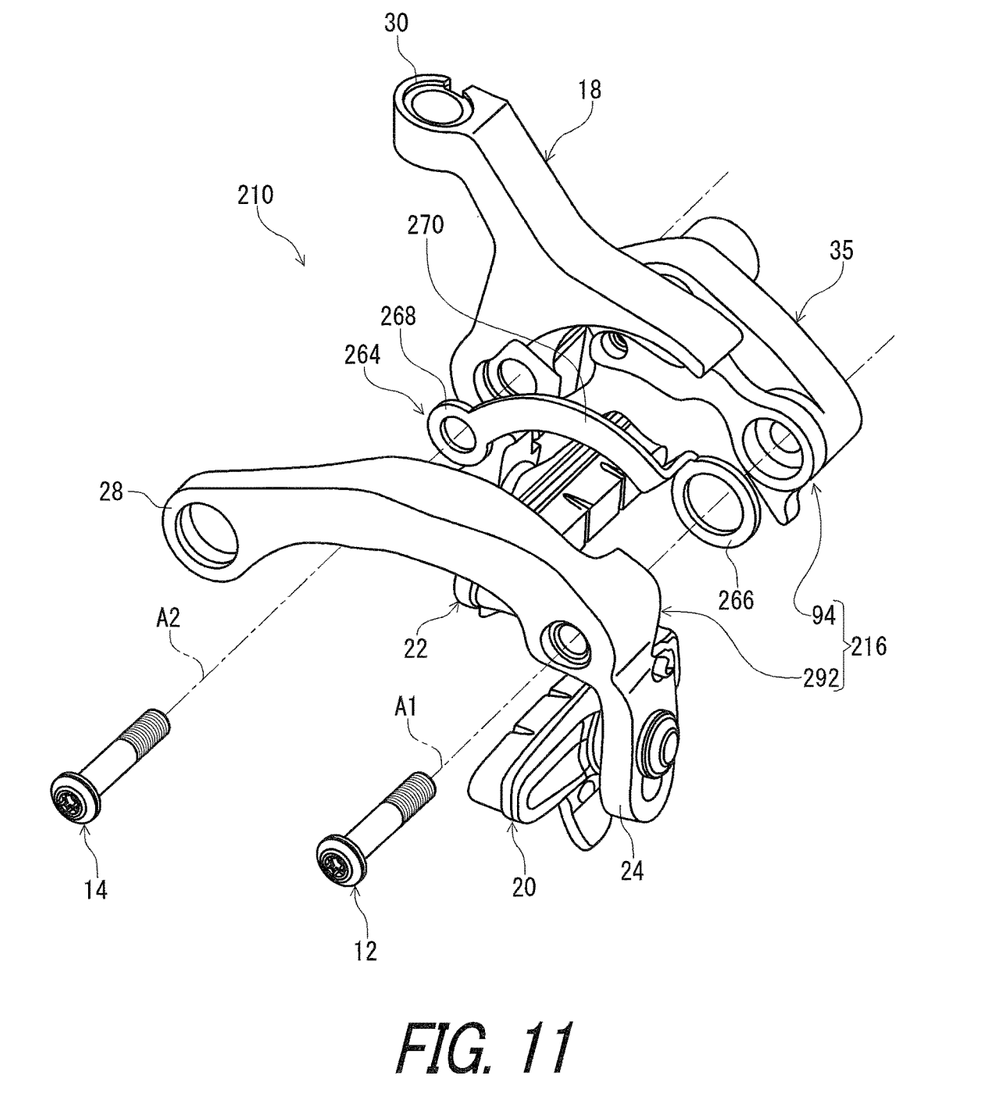
FIG. 11 is an exploded perspective view of a bicycle rim brake in accordance with a second embodiment.

As seen in FIG. 11, the bicycle rim brake 210 comprises a reinforcing member 264. The reinforcing member 264 has substantially the same structure as that of the reinforcing member 64 in the first embodiment. The reinforcing member 264 includes a first coupling part 266, a second coupling part 268, and an intermediate part 270. In this embodiment, the first coupling part 266 is offset from the intermediate part 270 and the second coupling part 268. The first coupling part 266, the second coupling part 268, and the intermediate part 270 have substantially the same structures as those of the first coupling part 66, the second coupling part 68, and the intermediate part 70 in the first embodiment. Thus, they will not be described and/or illustrated in detail here for the sake of brevity. In this embodiment, an arm body 292 of a first brake arm 216 has no groove to arrange the first coupling part 266. The first coupling part 266 is arranged between the arm body 292 and the intermediate member 94 such that the first coupling part 266 is in contact with both the arm body 292 and the intermediate member 94.

With the bicycle rim brake 210, it is possible to obtain substantially the same effects as those of the bicycle rim brake 10 in accordance with the first embodiment.

It will be apparent to those skilled in the bicycle field from the present disclosure that the structures of the above embodiments can be at least partly combined with each other.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle rim brake comprising:
a first shaft defining a first pivot axis, the first shaft including a first fixed end part fixedly provided with respect to a bicycle body;
a second shaft defining a second pivot axis, the second shaft including a second fixed end part fixedly provided with respect to the bicycle body;
a first brake arm pivotally provided on the first shaft around the first pivot axis;
a second brake arm pivotally provided on the second shaft around the second pivot axis; and
a reinforcing member joining the first shaft to the second shaft, the reinforcing member being provided such that the first brake arm is at least partially arranged farther from the first fixed end part than the reinforcing member, the reinforcing member being a separate member from the first shaft and the second shaft, the reinforcing member being provided between the first brake arm and the second brake arm in an axial direction parallel to the first pivot axis.

2. The bicycle rim brake according to claim 1, wherein the first brake arm includes a groove, and
the reinforcing member includes a first coupling part arranged in the groove.

3. The bicycle rim brake according to claim 1, wherein the reinforcing member is provided such that the second brake arm is at least partially arranged closer to the second fixed end part than the reinforcing member.

4. The bicycle rim brake according to claim 3, wherein the second shaft includes
a second head part, and
a second supporting part extending between the second fixed end part and the second head part so as to pivotally support the second brake arm, and
the reinforcing member includes a second coupling part arranged between the second brake arm and the second head part.

5. The bicycle rim brake according to claim 4, wherein the second brake arm includes a recess, and
the second coupling part and the second head part are arranged in the recess.

6. The bicycle rim brake according to claim 3, wherein the first brake arm and the second brake arm are configured such that a space is provided between the first brake arm and the second brake arm when viewed from a perpendicular direction perpendicular to at least one of the first pivot axis and the second pivot axis, and
the reinforcing member is at least partially arranged in the space.

7. The bicycle rim brake according to claim 1, wherein the first brake arm includes an offset part arranged farther from the bicycle body than the second brake arm when viewed from a perpendicular direction perpendicular to at least one of the first pivot axis and the second pivot axis, and
the reinforcing member is arranged between the offset part of the first brake arm and the second brake arm.

8. The bicycle rim brake according to claim 1, wherein the first pivot axis and the second pivot axis are substantially parallel to each other.

9. A bicycle rim brake comprising:
a first shaft defining a first pivot axis, the first shaft including a first fixed end part fixedly provided with respect to a bicycle body;
a second shaft defining a second pivot axis, the second shaft including a second fixed end part fixedly provided with respect to the bicycle body;
a first brake arm pivotally provided on the first shaft around the first pivot axis;
a second brake arm pivotally provided on the second shaft around the second pivot axis;
a reinforcing member joining the first shaft to the second shaft, the reinforcing member being provided such that the first brake arm is at least partially arranged farther from the first fixed end part than the reinforcing member; and
a base member,
the first shaft and the second shaft being provided on the base member.

10. The bicycle rim brake according to claim 9, wherein the base member includes a mounting shaft, the mounting shaft being arranged apart from the first shaft and the second shaft.

11. The bicycle rim brake according to claim 10, wherein the mounting shaft is arranged such that a first distance between the mounting shaft and the first shaft is substantially equal to a second distance between the mounting shaft and the second shaft when viewed from a parallel direction parallel to the mounting shaft.

12. The bicycle rim brake according to claim 10, wherein the first brake arm includes a first mounting part to mount a first friction member to the first brake arm,
the second brake arm includes a second mounting part to mount a second friction member to the second brake arm,
the mounting shaft is farther from the first mounting part than the first shaft, and the mounting shaft is farther from the second mounting part than the second shaft.

13. The bicycle rim brake according to claim 1, wherein the reinforcing member includes
a first coupling part including a first opening,
a second coupling part including a second opening, and
an intermediate part provided between the first coupling part and the second coupling part,
the first shaft extends through the first opening, and
the second shaft extends through the second opening.

14. The bicycle rim brake according to claim 13, wherein the second coupling part is offset from a first plane on which the first coupling part is arranged.

15. The bicycle rim brake according to claim 14, wherein the intermediate part is arranged on the first plane.

16. The bicycle rim brake according to claim 1, wherein the first brake arm includes a wire attachment part to attach an inner wire of a control cable to the first brake arm, and
the second brake arm includes an outer-casing attachment part to attach an outer casing of the control cable to the second brake arm.

17. A bicycle rim brake comprising:
a base member including a mounting shaft;
a first shaft provided on the base member apart from the mounting shaft;
a second shaft provided on the base member apart from the mounting shaft and the first shaft;
a first brake arm pivotally provided on the first shaft, the first brake arm including a first contact part;
a second brake arm pivotally provided on the second shaft, the second brake arm including a second contact part being in contact with the first contact part; and
a reinforcing member joining the first shaft to the second shaft,
the first shaft including a first fixed end part fixed to the base member,
the first brake arm having an opposite surface opposite to the first fixed end part, and
the reinforcing member being at least partially arranged between the first fixed end part of the first shaft and the opposite surface of the first brake arm.

18. A bicycle rim brake comprising:
a base member including a mounting shaft;
a first shaft provided on the base member apart from the mounting shaft;
a second shaft provided on the base member apart from the mounting shaft and the first shaft;
a first brake arm pivotally provided on the first shaft, the first brake arm including a first contact part;
a second brake arm pivotally provided on the second shaft, the second brake arm including a second contact part being in contact with the first contact part; and
a reinforcing member joining the first shaft to the second shaft,
the first shaft including a first fixed end part fixed to the base member, and
the reinforcing member being provided such that the first brake arm is at least partially arranged farther from the first fixed end part than the reinforcing member.

19. A bicycle rim brake comprising:
a first shaft defining a first pivot axis, the first shaft including a first fixed end part fixedly provided with respect to a bicycle body;
a second shaft defining a second pivot axis, the second shaft including a second fixed end part fixedly provided with respect to the bicycle body;
a first brake arm pivotally provided on the first shaft around the first pivot axis, the first brake arm having an opposite surface opposite to the first fixed end part;
a second brake arm pivotally provided on the second shaft around the second pivot axis; and
a reinforcing member joining the first shaft to the second shaft, the reinforcing member being at least partially arranged between the first fixed end part of the first shaft and the opposite surface of the first brake arm, the reinforcing member being a separate member from the first shaft and the second shaft, the reinforcing member being provided between the first brake arm and the second brake arm in an axial direction parallel to the first pivot axis.

20. The bicycle rim brake according to claim 19, wherein the reinforcing member includes
a first coupling part including a first opening,
a second coupling part including a second opening, and
an intermediate part provided between the first coupling part and the second coupling part,
the first shaft extends through the first opening, and
the second shaft extends through the second opening.

21. The bicycle rim brake according to claim 20, wherein the first shaft includes a first supporting part provided in the first opening,
the second shaft includes a second supporting part provided in the second opening,
an inner diameter of the first opening is larger than an outer diameter of the first supporting part, and
an inner diameter of the second opening is larger than an outer diameter of the second supporting part.

22. The bicycle rim brake according to claim 13, wherein the first shaft includes a first supporting part provided in the first opening,
the second shaft includes a second supporting part provided in the second opening,
an inner diameter of the first opening is larger than an outer diameter of the first supporting part, and
an inner diameter of the second opening is larger than an outer diameter of the second supporting part.

23. The bicycle rim brake according to claim 1, wherein the reinforcing member extends from the first shaft to the second shaft.

24. The bicycle rim brake according to claim 9, wherein the reinforcing member is provided between the first brake arm and the second brake arm in an axial direction parallel to the first pivot axis.

25. The bicycle rim brake according to claim 9, wherein the reinforcing member extends from the first shaft to the second shaft.

26. The bicycle rim brake according to claim 17, wherein the first shaft defines a first pivot axis, and
the reinforcing member is provided between the first brake arm and the second brake arm in an axial direction parallel to the first pivot axis.

27. The bicycle rim brake according to claim 17, wherein the reinforcing member extends from the first shaft to the second shaft.

28. The bicycle rim brake according to claim 18, wherein the first shaft defines a first pivot axis, and
the reinforcing member is provided between the first brake arm and the second brake arm in an axial direction parallel to the first pivot axis.

29. The bicycle rim brake according to claim 18, wherein the reinforcing member extends from the first shaft to the second shaft.

30. The bicycle rim brake according to claim 19, wherein the reinforcing member extends from the first shaft to the second shaft.

\* \* \* \* \*